Figure 1:
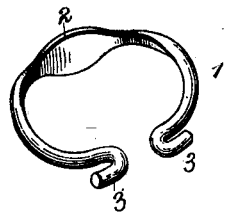

(No Model.)

J. D. ABELL.
BUDDING CLASP.

No. 603,807. Patented May 10, 1898.

Witnesses
Victor J. Evans.
James F. Duhamel.

Inventor
John D. Abell.
By John Wedderburn. Attorney

UNITED STATES PATENT OFFICE.

JOHN D. ABELL, OF TALLAPOOSA, GEORGIA.

BUDDING-CLASP.

SPECIFICATION forming part of Letters Patent No. 603,807, dated May 10, 1898.

Application filed September 24, 1897. Serial No. 652,881. (No model.)

*To all whom it may concern:*

Be it known that I, JOHN D. ABELL, a citizen of the United States, residing at Tallapoosa, in the county of Haralson and State of Georgia, have invented certain new and useful Improvements in Budding-Clasps; and I do hereby declare the following to be a full, clear, and exact description of the invention, such as will enable others skilled in the art to which it appertains to make and use the same.

This invention relates to budding-clasps, and the object in view is to provide an efficient clasp whereby in the grafting of trees, flowers, &c., the bud or scion may be properly held in position in the cleft or slit and securely retained.

The details, objects, and advantages of the invention will be pointed out in the course of the ensuing description.

The invention consists in an improved budding-clasp embodying certain novel features and details of construction, as hereinafter fully described, illustrated in the drawings, and incorporated in the claim.

Figure 2:
Figure 3:
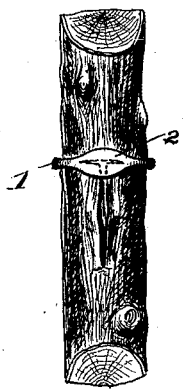

In the accompanying drawings, Figure 1 is a perspective view of the improved budding-clasp. Fig. 2 is a detail perspective view showing a portion of the tree grafted with the clasp omitted. Fig. 3 is a similar view showing the clasp in position.

Similar numerals of reference designate corresponding parts in all the views.

Referring to the drawings, 1 designates the improved clasp, which is preferably composed of a single piece of soft wire of sufficient length to extend around the limb or portion of the tree or flower to be operated upon. This clasp is formed of lead or other soft wire, and at its central portion it is flattened and broadened out to form a wide bearing-surface 2, and this portion of the clasp is placed over the grafting, as shown in Fig. 3. The ends of the wire are passed around the limb or flower and are reversely hooked or curved, as indicated at 3, so that they may be readily interlocked with each other for holding the clasp in position.

The tree may be grafted in any of the well-known methods, that shown being in the form of a T-shaped slit or cleft made through the bark of the tree. In this cleft or slit, and between the bark and the wood of the stock, the scion or bud is inserted. The flap portions of the bark are then closed in upon the bud or scion, after which the clasp hereinabove described is applied with a flat or widened portion thereof outside of and over the scion. The ends of the clasp are then hooked or interlocked.

From the foregoing description it will be seen that I have provided a simple, cheap, and convenient clasp which may be applied to a grafted tree in an instant, and which will not only securely retain itself in position thereon, but which by reason of its softness will accommodate itself to the contour of the limb, and which will also yield and release itself from the limb or tree at the proper time.

Having thus described the invention, what is claimed as new, and desired to be secured by Letters Patent, is—

The herein-described budding-clasp, consisting of a strip of metal flattened at its central portion to form a wide bearing-surface for covering the scion or bud, the end portions of said clasp being adapted to have their extremities interlocked or hooked together, substantially as described.

In testimony whereof I have signed this specification in the presence of two subscribing witnesses.

JOHN D. ABELL.

Witnesses:
 F. A. B. GOLE,
 T. A. DOLAN.